United States Patent
Nair (10) Patent No.: US 11,907,941 B2
(45) Date of Patent: Feb. 20, 2024

(54) ANONYMIZATION OF DATA FIELDS IN TRANSACTIONS

(71) Applicant: EntIT Software LLC, Sunnyvale, CA (US)

(72) Inventor: Sushil Nair, Sunnyvale, CA (US)

(73) Assignee: Micro Focus LLC, Santa Clara, CA (US)

(*) Notice: Subject to any disclaimer, the term of this patent is extended or adjusted under 35 U.S.C. 154(b) by 813 days.

(21) Appl. No.: 15/862,346

(22) Filed: Jan. 4, 2018

(65) Prior Publication Data

US 2019/0205869 A1 Jul. 4, 2019

(51) Int. Cl.
G06Q 20/38 (2012.01)
G06F 21/62 (2013.01)
G06Q 20/32 (2012.01)

(52) U.S. Cl.
CPC ....... *G06Q 20/383* (2013.01); *G06F 21/6254* (2013.01); *G06Q 20/3223* (2013.01); *G06Q 20/3226* (2013.01)

(58) Field of Classification Search
None
See application file for complete search history.

(56) References Cited

U.S. PATENT DOCUMENTS

| | | | |
|---|---|---|---|
| 7,167,924 B1 * | 1/2007 | Symonds | G06Q 20/10 705/43 |
| 8,930,381 B2 | 1/2015 | Raghunathan et al. | |
| 9,076,010 B2 | 7/2015 | Toyoda et al. | |
| 9,129,133 B2 | 9/2015 | LaFever et al. | |
| 9,356,993 B1 | 5/2016 | Kothari et al. | |
| 9,467,424 B2 * | 10/2016 | Gluck | H04L 63/0281 |
| 9,846,716 B1 * | 12/2017 | Scott | G06F 21/6245 |
| 10,333,901 B1 * | 6/2019 | Bauman | H04L 63/0407 |
| 2005/0033777 A1 * | 2/2005 | Moraes | G06F 16/27 |
| 2012/0131481 A1 * | 5/2012 | Gupta | G06F 16/254 715/764 |
| 2012/0221421 A1 * | 8/2012 | Hammad | G06Q 10/00 705/16 |

(Continued)

FOREIGN PATENT DOCUMENTS

| | | | |
|---|---|---|---|
| CA | 2363687 A1 * | 9/2000 | ............. H04L 69/04 |
| WO | WO-2017187207 A1 | 2/2017 | |

OTHER PUBLICATIONS

Lautenschlager, et al., "A generic Solution for web-based management of pseudonymized data", BMC Medical Informatics and Decision Making (2015). (Year: 2015).*

(Continued)

*Primary Examiner* — Neha Patel
*Assistant Examiner* — Clay C Lee
(74) *Attorney, Agent, or Firm* — Sheridan Ross P.C.

(57) ABSTRACT

In some examples, a system renders, in a user interface, data fields of an interface code, the interface code to input or output the data fields in a transaction, and receives a selection, made in the user interface, of a first data field from among the data fields of the interface code. The system modifies the interface code by adding an indicator associated with the first data field, the indicator specifying anonymization of the first data field during the transaction that uses the first data field, the modifying of the interface code producing a modified interface code.

20 Claims, 5 Drawing Sheets

(56) References Cited

U.S. PATENT DOCUMENTS

| | | | | |
|---|---|---|---|---|
| 2014/0040134 A1* | 2/2014 | Ciurea | ................ | G06Q 20/383 |
| | | | | 705/44 |
| 2014/0201007 A1* | 7/2014 | Stack | .................... | G06Q 10/10 |
| | | | | 705/14.66 |
| 2017/0142092 A1 | 5/2017 | Lim | | |
| 2017/0149793 A1* | 5/2017 | Spertus | ................ | H04L 63/105 |

OTHER PUBLICATIONS

ARX—Powerful Data Anonymization, Anonymization Tool downloaded Nov. 15, 2017 (5 pages).
IBM Knowledge Center, Basic mapping support, https://www.ibm.com/support/knowledgecenter/en/SSGMCP_4.2.0/com.ibm.cics.ts applicationprogramming.doc/topics/dfhp370.html downloaded on Dec. 7, 2017 (3 pages).
Voltage Security, White Paper, Streamlining Information Protection Through a Data-centric Security Approach, 2013 (13 pages).
Wikipedia, CICS last edited Jul. 6, 2017 (15 pages).
Wikipedia, Mainframe computer last edited Nov. 19, 2017 (8 pages).

\* cited by examiner

ANONYMIZATION OF DATA FIELDS IN TRANSACTIONS

BACKGROUND

Transactions can be executed in transaction processing systems. During a transaction, data can be communicated and output. Transactions can be executed in a computer or in a collection of computers.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Data can be communicated between different entities (e.g., users, programs, and/or machines) during a transaction. As used here, a "transaction" refers to any collection of activities that processes or uses data. A transaction can be supported by a transaction processing system, which is a system implemented with a computer or a collection of computers.

In some examples, a transaction processing system can be implemented using a mainframe computer or a collection of mainframe computers. A mainframe computer can refer to a computer with relatively extensive processing capabilities and redundancy to protect against failure of electronic components and/or errors in data. For example, a mainframe computer can include redundant processors, and/or redundant memory or storage subsystems, and/or other redundant resources. Although reference is made to mainframe computers in some examples, it is noted that in other examples, transaction processing systems can be implemented using non-mainframe computers.

A transaction processing system can support multiple transactions using system resources (e.g., processing resources, memory resources, communication resources, etc.) of the transaction processing system. For example, the multiple transactions can be executed in an interleaved or concurrent manner to allow the multiple transactions to share the system resources.

To protect data against unauthorized access during transactions performed by a transaction processing system, anonymization can be applied to the data communicated between different entities. Anonymization of data can refer to encrypting the data, applying tokenization to the data, scrambling the data, or performing any other type of obfuscation of the data such that the data is transformed from an original form to a different form that prevents an unauthorized entity from accessing the data in the original form.

In some examples, a human programmer may have to manually analyze a source code of a program that executes during a transaction. In the manual analysis of the program source code, the human programmer can identify sensitive data fields that are to be protected. However, the program source code can be complex, especially in program source code for mainframe computers or in situations where personnel with the appropriate skills are not available or comments or documents are not available. Moreover, understanding inter-dependencies between different parts of the program and between different programs for the purpose of identifying data fields to anonymize can be challenging.

It can thus be challenging to identify exact locations in the program source code where anonymization or de-anonymization calls have to be introduced. Also, it can be complex to ensure that modified portions of the source code are functionally equivalent to corresponding portions of the original source code, and to test the source code to ensure that there is no security exposure. The foregoing analysis and source code modification is labor-intensive and error-prone.

In accordance with some implementations of the present disclosure, techniques and mechanisms for anonymizing data used during transactions can include an analysis stage and a runtime stage. In the analysis stage, a system can render data fields of an interface code in a user interface. An "interface code" can refer to a code that inputs and outputs data. An interface code can be associated with a program, with the interface code used to output data for the program. Examples of an interface code include an interface code to display data in a display screen, an interface code to print data, an interface code to transmit data over a network, and so forth. Note that the interface code can be separate from the program, or can be part of the program.

In the analysis stage, a system can receive a selection, made in the user interface, of a selected data field from among the data fields input and/or output by the interface code. The system can modify the interface code by adding an indicator associated with the selected data field, the indicator specifying anonymization of the selected data field during the transaction that uses the selected data field. The modifying of the interface code produces a modified interface code.

By adding the indicators specifying anonymization of selected data fields to the interface code instead of the associated program, some techniques or mechanisms according to the present disclosure can avoid making modifications to the associated program or having to understand the logic of the program. Thus, adding the indicators specifying anonymization to the interface code allows for achieving a level of security to protect selected data fields without having to modify the associated program.

In the runtime stage, when a data value for the selected data field is received in a transaction, the system can intercept the selected data field, apply the anonymization of the selected data field during the transaction (applied anonymization producing an anonymized data field), and use the anonymized first data field during the given transaction without de-anonymizing the anonymized first data field. For example, when a data value is entered for the selected data field, the data value of the selected data field can be anonymized. The data value of the selected data field can remain anonymized throughout the transaction (such as when the data value of the selected data field is read, stored to memory, stored in a persistent storage such as a disk, or processed by processor) so that data leak is prevented or reduced. In some cases, if the data value of the selected data field is to be displayed, the data value of the selected data field can be de-anonymized (either fully or partially) so that an authorized user can view the fully or partially de-anonymized data value.

Figure 1:
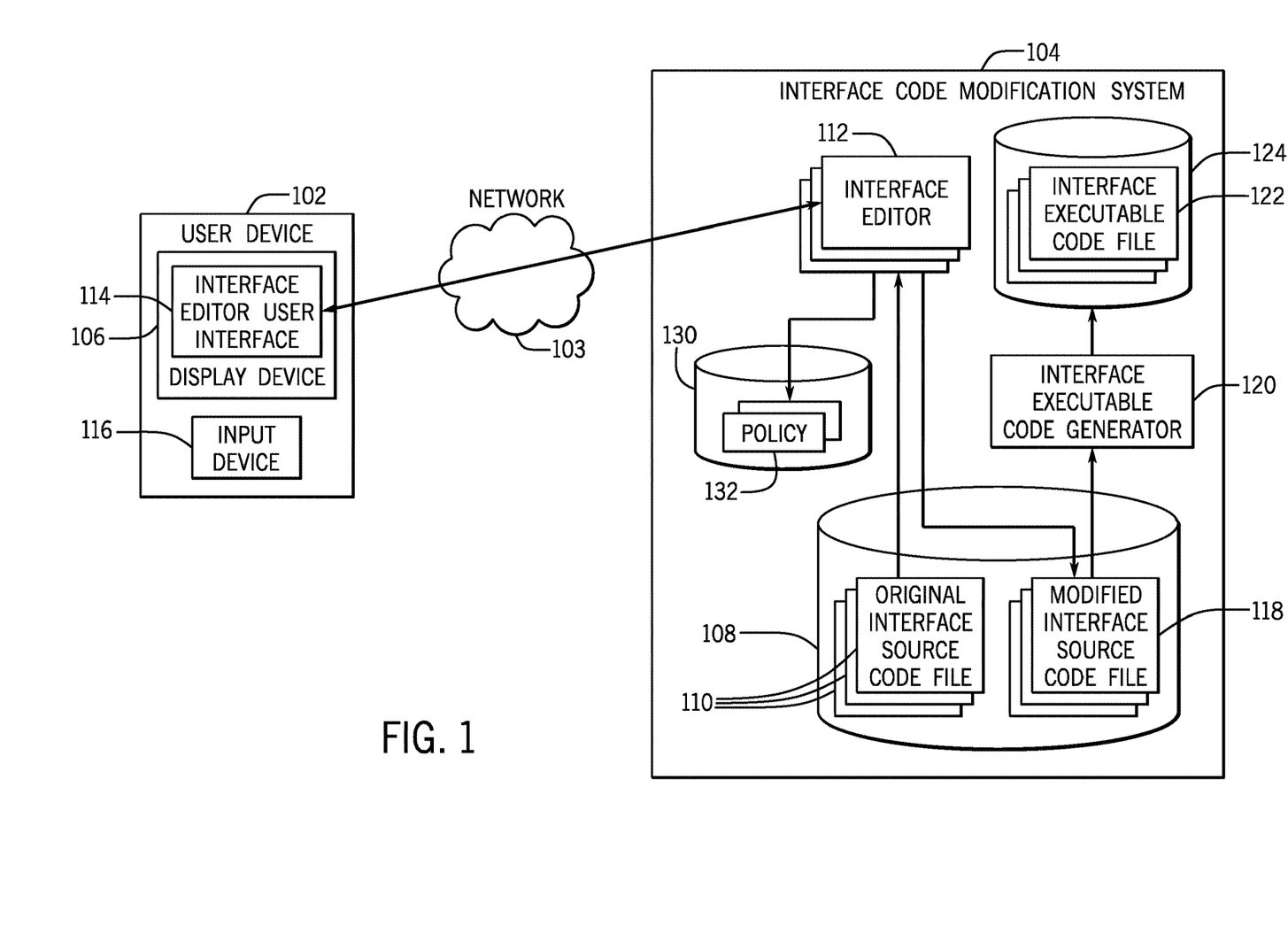
FIG. 1 is a block diagram of an arrangement that includes a user device and an interface code modification system, according to some examples.

FIG. 1 is a block diagram of an example arrangement that includes a user device 102 and an interface code modification system 104 according to some implementations of the present disclosure. The user device 102 can be any electronic device that includes a display device 106 to allow a user to display information provided by the interface code modification system 104 over a network 103. For example, the user device 102 can include a terminal device, a computer (e.g., a notebook computer, a desktop computer, a tablet computer, etc.), a smartphone, and so forth.

The interface code modification system 104 can be used during the analysis stage, and can include a source code repository 108 that stores original interface source code files 110. The source code repository 108 can be implemented using a storage device or a collection of storage devices. Although a specific number of original interface source code files 110 is depicted in FIG. 1, it is noted that in other examples, the source code repository 108 can store a different number of original interface source code files (one original interface source code file or more than one original interface source code file).

Each original interface source code file 110 can include source code that inputs data and outputs data, such as displays data, prints data, or communicates data over a network, as examples. The data that is output by the original interface source code file 110 (or more specifically, by an interface executable code that is produced based on the original interface source code file 110), can include data fields. A "data field" can refer to any piece of data that can be output, such as a person's name, a person's social security number, a quantity of a product, a price of a product, or any other information that relates to a person, a product, a service, or any other entity.

The interface code modification system 104 also can include an interface editor 112, which can be implemented as machine-readable instructions executable on a processor (or multiple processors) of the interface code modification system 104.

The interface editor 112 can include a parser that is able to parse the original interface source code file 110 to generate an output that includes the data fields. The syntax specifies each data field, where in the interface the data field is to be output (e.g., displayed, printed, etc.), attributes of the data field (e.g., a display attribute of the data field, such as whether the data field should be made bright, highlighted, etc.), and so forth. The parser when parsing the original interface source code file 110 can then render on an interface editor user interface 114 exactly what the user would see on each type of device the data is to be output. In addition, the interface editor user interface 114 provided by the interface editor 112 can allow a user to select interesting data fields (such as for anonymization) and assign characteristics to modify the data field.

In some examples, there can be separate interface editors 112 for respective original interface source code files 110. For example, each different type of original interface source code file 110 can be associated with a corresponding interface editor 112. In other examples, the same interface editor can be used to process different types of original interface source code files 110.

The interface editor 112 can produce the output including the data fields of the original interface source code file 110 in the interface editor user interface 114 that is displayed by the display device 106 of the user device 102. In some examples, the interface editor user interface 114 can include a graphical user interface that includes selectable graphical elements representing respective data fields. In other examples, the interface editor user interface 114 can include a different type of user interface, such as a text-based interface, a command line interface, and so forth.

Using an input device 116 of the user device 102, a user at the user device 102 can select a data field (or alternatively, multiple data fields) of the output that is presented by the interface editor 112 in the interface editor user interface 114. The input device 116 can include a keyboard, a pointing device such as a mouse device or a track pad, or a touch-sensitive surface such as a touch-sensitive display screen, and so forth.

A selection of a data field for anonymization can be communicated back from the user device 102 to the interface code modification system 104, such as over the network 103.

In response to each received selection of a data field for anonymization from the user device 102, the interface editor 112 can modify the corresponding original interface source code file 110 to produce a respective modified interface source code file 118. The modified interface source code file 118 can be stored in the source code repository 108 (or alternatively, in a separate source code repository). For each original interface source code file 110 that is modified, the interface editor 112 can generate a corresponding modified interface source code file 118.

The modification of the original interface source code file 110 can involve adding an indicator associated with each data field selected in the interface editor user interface 114 for anonymization. The indicator that is added specifies anonymization of a data field during a transaction that uses the data field. The modified interface source code file 118 can include the indicator that is added.

In some examples, the indicator that is associated with each data field to be anonymized is an exit indicator that causes the interface code to call back an exit or callback function when a data value of the data field is to change during execution of the interface code. In examples where a transaction processing system is a Customer Information Control System (CICS) from IBM, each original interface source code file 110 can be according to the Basic Mapping Support (BMS) interface, and the exit indicator can include a Global User Exit (GLUE). BMS is an application programming interface (API) between a CICS program and a terminal device.

In other examples, other types of transaction processing systems can be used, and each original interface source code file 110 can be according to other formats.

In some examples, a data field can be associated with a number of attributes. Some of the attributes can specify an output form of the data field, such as a brightness attribute, an attribute to indicate that the data field is not to be displayed when a value is entered, or any other attribute that controls how the data field is to be displayed. In further examples, other attributes can be associated with a data field. A further attribute that can be associated with a data field can be an exit attribute (or more generally, the exit indicator), which if set to an active value causes execution of the interface code to be directed to a callback program. On the other hand, if the exit attribute is an inactive value, then a callback program is not invoked when the data field is encountered during execution of the interface code in a transaction.

An interface executable code generator 120 in the interface code modification system 104 can generate respective interface executable code files 122 from the corresponding modified interface source code files 118. In some examples, the interface executable generator 120 can include a compiler to compile each modified interface source code file 118. In other examples, the interface executable code generator 120 can include a macro generator that generates a macro (in the form of an interface executable code file 122) from a respective modified interface source code file 118. In further examples, the interface executable code generator 120 can include an assembler to assemble the modified interface source code file 118 into assembly code, which is machine code executable by a system.

In additional examples, other types of code generators can be used.

The interface executable code files 122 can be stored in an executable code repository 124, which can be implemented with a storage device or a number of storage devices. The repository 124 can be the same as or different from the repository 108.

In addition to being able to select data fields for anonymization, the user at the user device 102 can also set anonymization policies 132, using the interface editor user interface 114 presented by the interface editor 112, governing how a data field selected for anonymization is to be anonymized or de-anonymized. FIG. 1 shows an example where policies 132 set by the user at the interface editor user interface 114 can be stored in a policy database 130. The interface editor user interface 114 can include elements that represent respective policies that are selectable by a user to associate the selected policies 132 with respective data fields. The policies 132 stored in the policy database 130 can be associated with a data field (or multiple data fields) of an interface executable code file 122.

Figure 2:
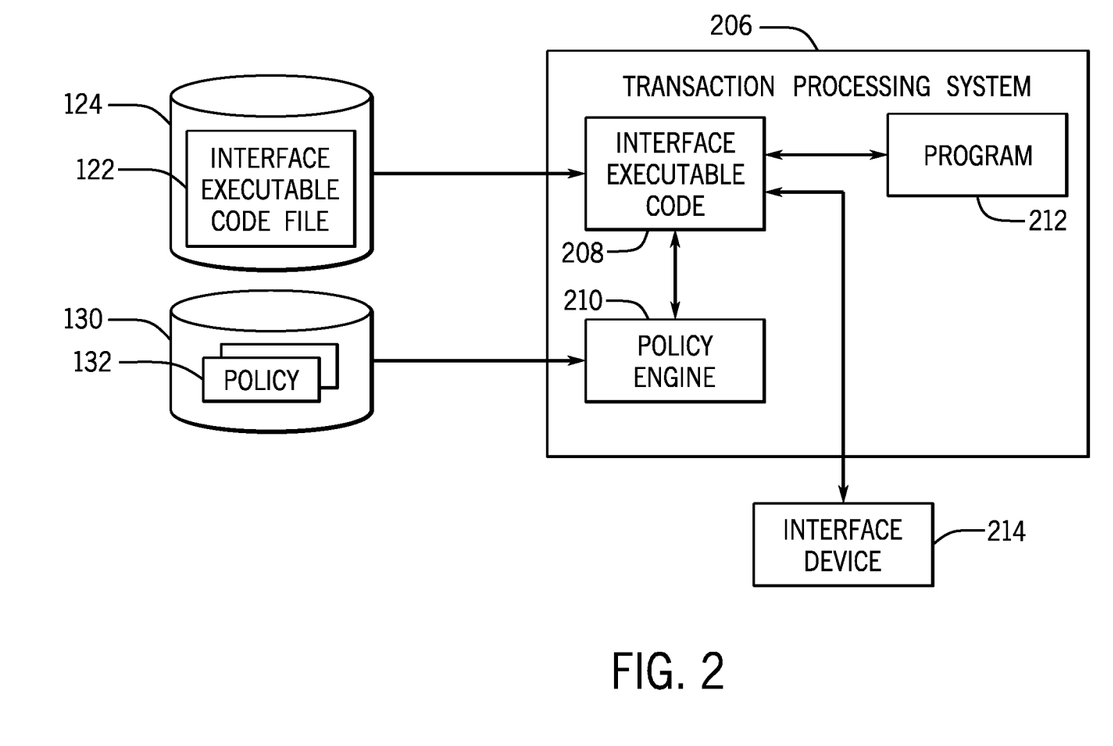
FIG. 2 is a block diagram of an arrangement that includes a transaction processing system according to further examples.

FIG. 2 shows a transaction processing system 206 in which an interface executable code 208 is executed during the runtime stage. Although FIGS. 1 and 2 show the interface code modification system 104 of FIG. 1 and the transaction processing system 206 of FIG. 2 as being separate systems, it is noted that in other examples, the interface code modification system 104 and the transaction processing system 206 can be part of the same system.

The interface executable code 208 can be executed from an interface executable code file 122 produced by the interface executable code generator 120 of FIG. 1 from a corresponding modified interface source code file 118.

The transaction processing system 206 also can include a policy engine 210 that can apply the policies 132 associated with a data field (or multiple data fields) that are to be output by the interface executable code 208 during runtime execution in the transaction processing system 206. The interface executable code 208 can be associated with a program 212 that executes in the transaction processing system 206. The program 212 can contain logic for performing transactions, whereas the interface executable code 208 includes the logic to output data fields.

The data fields can be output by the interface executable code 208 to an interface device 214, which can be a display of a user device or other electronic device, a printer, a network, and so forth. The multiple policies 132 can be associated with a particular data field. The different policies 132 can correspond to different user privileges, in some examples. More generally, the different policies 132 can be associated with different entities, such as users, programs, or machines.

For example, if a first user having a first privilege initiates a transaction executed by the transaction processing system 206, then a first policy 132 would be used to apply anonymization of the particular data field. On the other hand, if a second user having a second privilege initiates a transaction in the transaction processing system 206, then a second policy 132 would be used to apply anonymization (or de-anonymization) to the particular data field.

It is noted that after anonymization is applied to a data value of the particular data field, de-anonymization may be desirable in some cases. For example, for a user having a given privilege, it may be permissible to de-anonymize (either fully or partially) the data value of the particular data field to display the data value of the particular data field. The de-anonymization can be performed according to a selected policy—the selected policy can be a first policy if the requesting user or other entity has a first privilege, a first role, or some other permission level, and the selected policy can be a second policy if the requesting user or other entity has a second privilege, a second role, or some other permission level.

For example, the particular data field can be a social security number field, and the transaction processing system 206 may allow for the social security number to be completely visible (or partially visible) to a user on a display screen. A first policy can specify that the social security number is completely de-anonymized, so that the full social security number can be displayed. A second policy can specify that the social security number is partially de-anonymized (e.g., the last four digits of the social security number are de-anonymized, while the remaining digits of the social security number remain anonymized).

In cases where a data value of a data field is de-anonymized, the de-anonymized data value of the data field can be stored in a secure memory of the transaction processing system 206, to prevent the de-anonymized data value of the data field from being accessible to an unauthorized entity. The transaction processing system 206 can prevent the de-anonymized data value of the data field in the secure memory from being logged into a log file, such as a log file created when a crash or other error of the transaction processing system 206. This can avoid inadvertently storing a de-anonymized data value of a data field into a log file.

Figure 3:
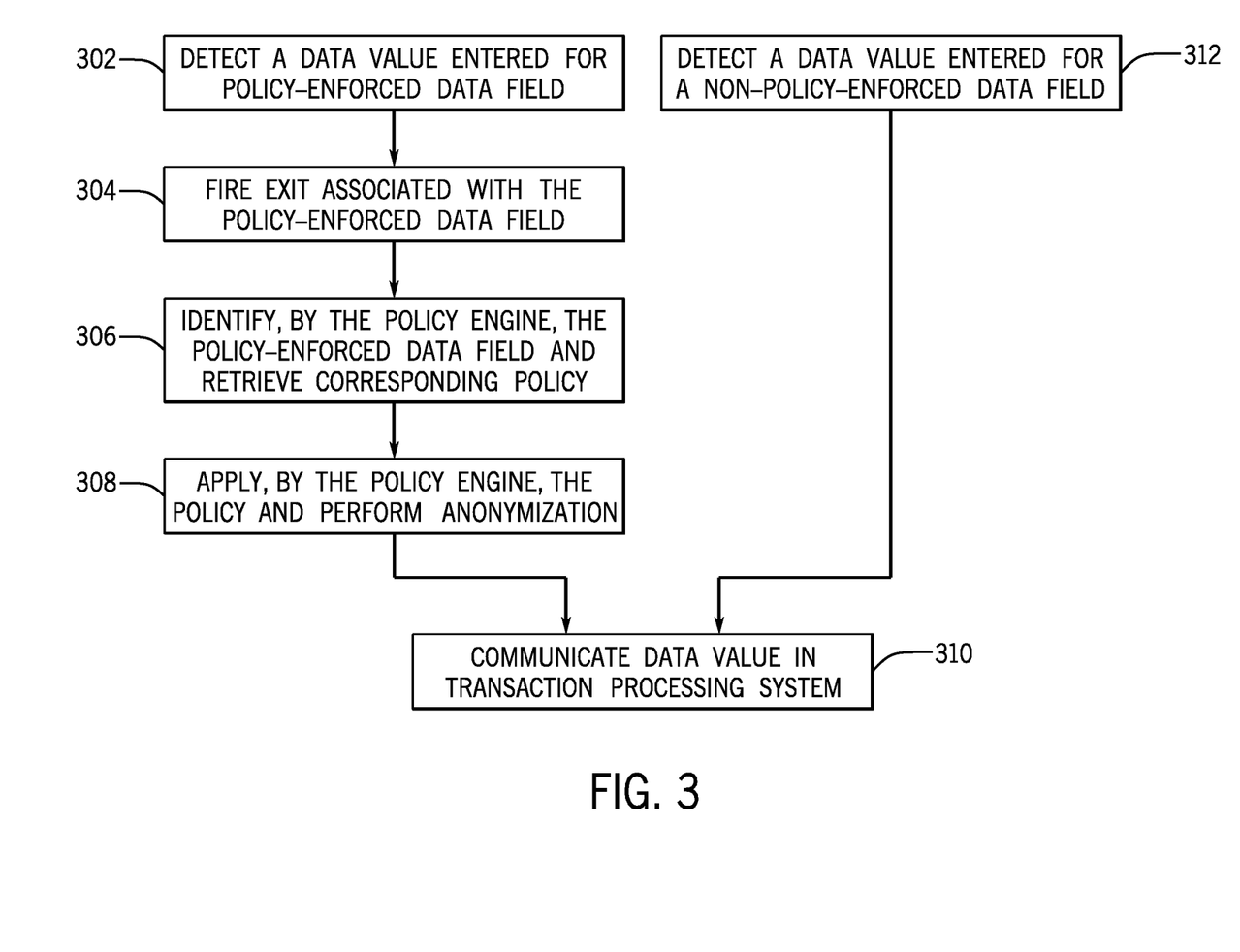
FIG. 3 is a flow diagram of a process according to some examples.

FIG. 3 is a flow diagram of a process relating to how entered data values are processed for a transaction by the transaction processing system 206, such as by machine-readable instructions executable in the transaction processing system 206. The transaction processing system 206 detects (at 302) a data value entered for a policy-enforced data field. The data value can be entered by a user or by another entity. A policy-enforced data field refers to a data field associated with an indicator set to an active value to indicate that the data field is to be anonymized during a transaction.

In response to the detecting (at 302), the transaction processing system 206 fires (at 304) the exit associated with the policy-enforced data field. Firing the exit refers to invoking the corresponding callback program associated with the exit indicator in the interface executable code 208. The callback program can be an entry point into the policy engine 210.

The policy engine 210 identifies (at 306) the policy-enforced data field and retrieves the corresponding policy, which can be selected from among multiple policies depending on a permission level of the entity that entered the data value. The policy engine 210 then applies (at 308) the corresponding policy and performs the specified anonymization (or de-anonymization) on the policy-enforced data field. The transaction processing system 206 then communicates (at 310) the anonymized data value in the transaction processing system. In the case of the policy-enforced data field, the data value that is communicated is an anonymized version of the data value of the policy-enforced data field.

In other examples, the transaction processing system 206 can detect (at 312) a data value entered for a non-policy-enforced data field. In such cases, anonymization of the data value for the non-policy-enforced data field is not performed, and the data communicated (at 310) in the transaction processing system 206 can be a non-anonymized version of the data value for the non-policy-enforced data field.

Figure 4:
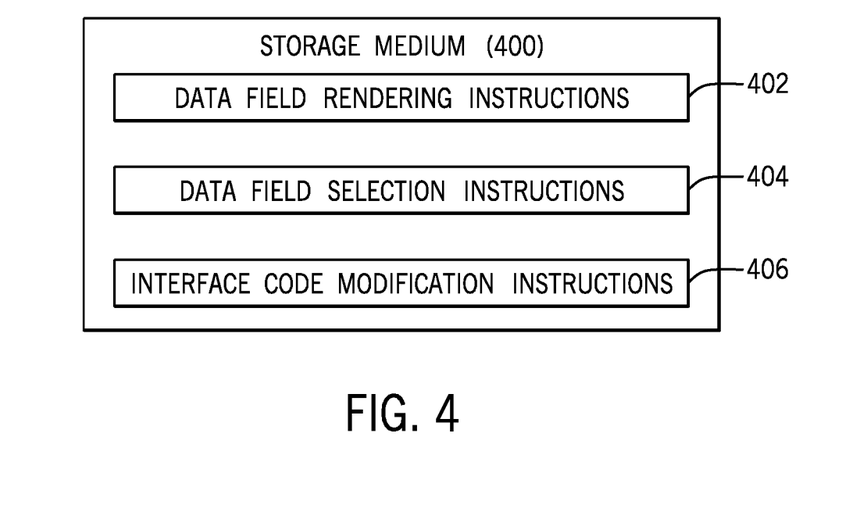
FIG. 4 is a block diagram of a storage medium storing machine-readable instructions according to further examples.

FIG. 4 is a block diagram of a non-transitory machine-readable or computer-readable storage medium 400 storing machine-readable instructions that upon execution cause a system to perform various tasks. The machine-readable instructions include data field rendering instructions 402 to render, in a user interface (such as the interface editor user interface 114 of FIG. 1), data fields of an interface code that is to input or output the data fields in a transaction. The machine-readable instructions further include data field selection instructions 404 to receive a selection, made in the user interface, of a first data field from among the data fields of the interface code. The machine-readable instructions further include interface code modification instructions 406 to modify the interface code by adding an indicator associated with the first data field, the indicator specifying anonymization of the first data field during the transaction that uses the first data field, the modifying of the interface code producing a modified interface code.

Figure 5:
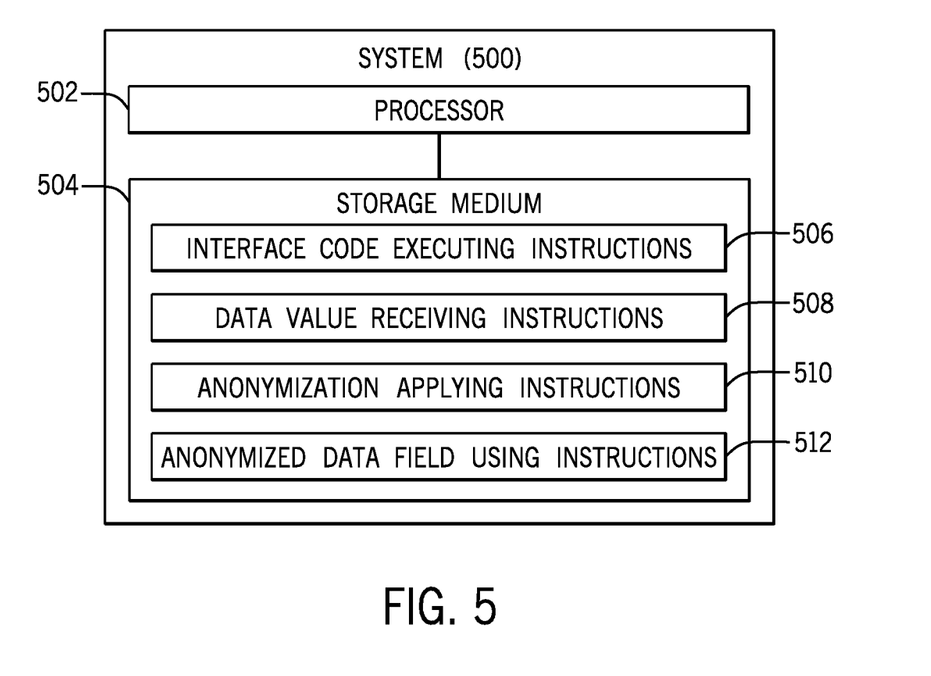
FIG. 5 is a block diagram of a system according to additional examples.

FIG. 5 is a block diagram of a system 500 that includes a processor 502 (or multiple processors), and a non-transitory storage medium 504 storing machine-readable instructions executable on the processor to perform various tasks. A processor can include a microprocessor, a core of a multi-core microprocessor, a microcontroller, a programmable integrated circuit, a programmable gate array, or another hardware processing circuit. Machine-readable instructions executable on a processor can refer to machine-readable instructions executable on a single processor or machine-readable instructions executable on multiple processors.

The machine-readable instructions include interface code executing instructions 506 to execute, in a transaction, an interface code that includes an indicator associated with a first data field to be input or output by the interface code. The machine-readable instructions further include data value receiving instructions 508 to receive a data value of the first data field during the transaction. The machine-readable instructions further include anonymization applying instructions 510 to apply anonymization of the data value of the first data field in response to the indicator, to produce an anonymized first data field value. The machine-readable instructions further anonymized data field using instructions 512 to use the anonymized first data field value during the transaction.

The system 500 can retrieve an anonymization policy from among a plurality of anonymization policies that are associated with the first data field in a policy database, where the applying of the anonymization of the data value of the first data field is based on retrieved anonymization policy. In some examples, the plurality of anonymization policies are associated with different entities, and the retrieving of the anonymization policy from among the plurality of anonymization policies is responsive to which entity invoked the transaction.

Figure 6:
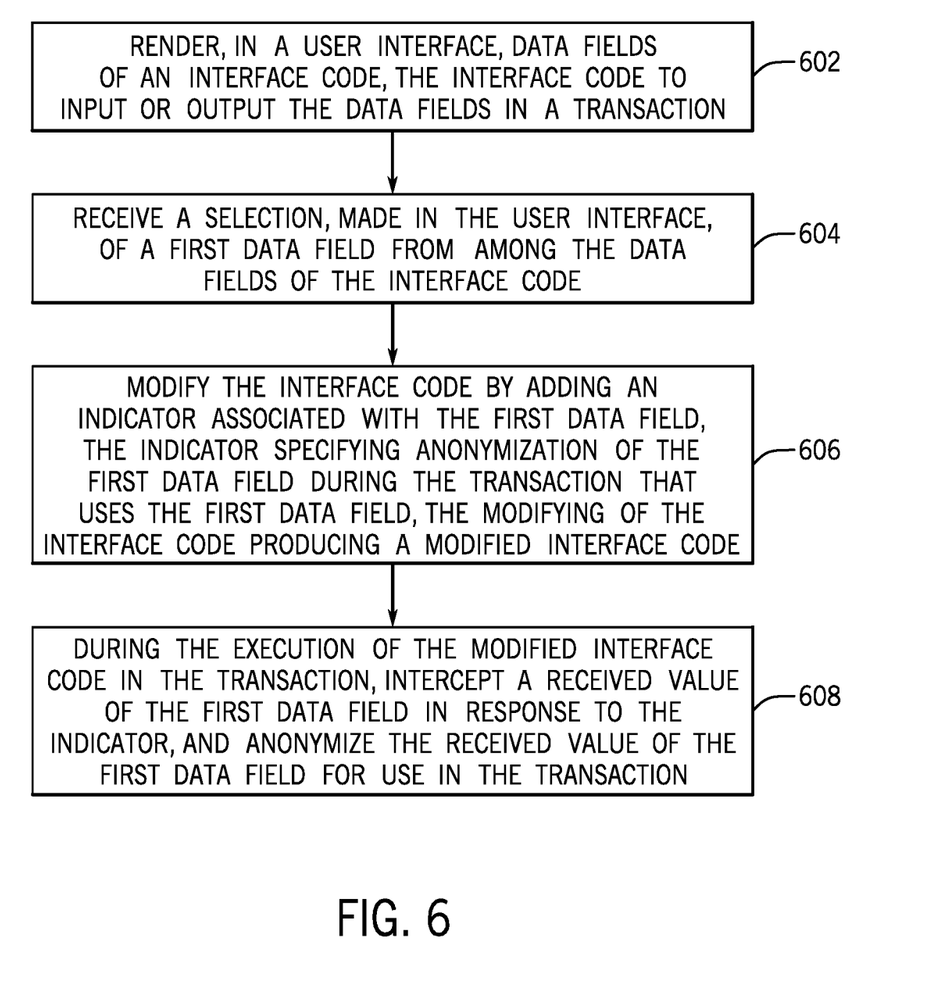
FIG. 6 is a flow diagram of a process according to other examples.

FIG. 6 is a flow diagram of a process performed by a system according to some examples. The process includes rendering (at 602), in a user interface, data fields of an interface code, the interface code to input or output the data fields in a transaction. The process includes receiving (at 604) a selection, made in the user interface, of a first data field from among the data fields of the interface code. The process further includes modifying (at 606) the interface code by adding an indicator associated with the first data field, the indicator specifying anonymization of the first data field during the transaction that uses the first data field, the modifying of the interface code producing a modified interface code. The process further includes, during execution of the modified interface code in the transaction, intercepting (at 608) a received value of the first data field in response to the indicator, and anonymizing the received value of the first data field for use in the transaction.

The storage medium 400 of FIG. 4 or 504 of FIG. 5 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that, when executed by one or more processors in a system, cause the one or more processors of the system to:
   parse a first interface source code to generate selectable data fields that are to be used in a transaction;
   cause the generated selectable data fields to be displayed on a user interface;
   receive a selection of a first data field from among the generated selectable data fields displayed on the user interface;
   in response to receiving the selection of the first data field, modify the first interface source code by adding, at a location in the first interface source code that generates the first data field, an indicator that instructs the one or more processors to anonymize a data value of the first data field during a given transaction that uses the first data field; and
   generate an executable interface code based on the modified first interface source code wherein the executable interface code is executable to perform an anonymization of the data value of the first data field.

2. The non-transitory machine-readable storage medium of claim 1, wherein the instructions are executable to cause the one or more processors of the system to:
   associate a policy with the first data field, the policy defining the anonymization of the data value of the first data field to apply during the given transaction.

3. The non-transitory machine-readable storage medium of claim 2, wherein the instructions are executable to cause the one or more processors of the system to:
   receive a selection of the policy through the user interface.

4. The non-transitory machine-readable storage medium of claim 2, wherein the anonymization defined by the policy is a first type of anonymization, and wherein the instructions are executable to cause the one or more processors of the system to:
   associate a second policy with the first data field, the second policy defining a second type of anonymization of the first data field to apply during a further transaction that uses the first data field.

5. The non-transitory machine-readable storage medium of claim 2, wherein the policy specifies that the anonymization is applied responsive to a first entity or a first group of entities invoking the given transaction, and wherein the instructions are executable to cause the one or more processors of the system to:
   associate a second policy with the first data field, the second policy specifying that the anonymization is not to be applied if a second entity or a second group of entities invokes a further transaction that uses the first data field.

6. The non-transitory machine-readable storage medium of claim 1, wherein the indicator in the modified first interface source code comprises an exit indicator that causes invocation of a callback program, and wherein the executable interface code when executed invokes the callback program to cause the anonymization of the data value of the first data field during the given transaction.

7. The non-transitory machine-readable storage medium of claim 6, wherein the callback program is an entry point to a policy engine, and the instructions are executable to cause the one or more processors of the system to:
   during the given transaction that uses the first data field, intercept the first data field; and
   apply, by the policy engine responsive to the callback program, the anonymization of the data value of the first data field during the given transaction.

8. The non-transitory machine-readable storage medium of claim 7, wherein the applying of the anonymization of the data value of the first data field during the given transaction comprises accessing a policy database to retrieve a policy that specifies the anonymization of the data value of the first data field.

9. The non-transitory machine-readable storage medium of claim 1, wherein the instructions are executable to cause the one or more processors of the system to:
   during execution of the executable interface code in the given transaction that uses the first data field, intercept the first data field;
   apply the anonymization of the data value of the first data field during the given transaction, the applied anonymization producing an anonymized first data field; and
   use the anonymized first data field during the given transaction without de-anonymizing the anonymized first data field.

10. A method executed by a system comprising a hardware processor, the method comprising:
    parsing a first interface source code to generate selectable data fields that are to be used in a transaction;
    causing the generated selectable data fields to be displayed on a user interface;
    receiving a selection of a first data field from among the generated selectable data fields displayed on the user interface;
    in response to receiving the selection of the first data field, modifying the first interface source code by adding, at a location in the first interface source code that generates the first data field, an indicator that instructs the hardware processor to anonymize a data value of the first data field during a given transaction that uses the first data field; and
    generating an executable interface code based on the modified first interface source code, wherein the executable interface code is executable to perform an anonymization of the data value of the first data field.

11. The method of claim 10, further comprising:
    during execution of the executable interface code in the given transaction, intercepting a received value of the first data field in response to the indicator; and
    anonymizing the received value of the first data field for use in the given transaction, wherein the anonymizing of the received value of the first data field comprises at least one selected from among encrypting the received value of the first data field, applying tokenization to the received value of the first data field, or scrambling the received value of the first data field.

12. The method of claim 10, further comprising:
    associating a policy with the first data field, the policy defining the anonymization of the data value of the first data field to apply during the given transaction.

13. The method of claim 12, further comprising:
    receiving a selection of the policy through the user interface.

14. The method of claim 12, wherein the anonymization defined by the policy is a first type of anonymization, and the method further comprising:
    associating a second policy with the first data field, the second policy defining a second type of anonymization of the first data field to apply during a further transaction that uses the first data field.

15. The method of claim 12, wherein the policy specifies that the anonymization is applied responsive to a first entity or a first group of entities invoking the given transaction, and the method further comprising:

associating a second policy with the first data field, the second policy specifying that the anonymization is not to be applied if a second entity or a second group of entities invokes a further transaction that uses the first data field.

16. The method of claim 10, wherein the indicator comprises an exit indicator that causes invocation of a callback program.

17. A system comprising:

a processor; and a non-transitory storage medium storing instructions executable on the processor to:

parse a first interface source code to generate selectable data fields that are to be used in a transaction;

cause the generated selectable data fields to be displayed on a user interface;

receive a selection of a first data field from among the generated selectable data fields displayed on the user interface;

in response to receiving the selection of the first data field, modify the first interface source code by adding, at a location in the first interface source code that generates the first data field, an indicator that instructs the processor to anonymize a data value of the first data field during a given transaction that uses the first data field; and generate an executable interface code based on the modified first interface source code, wherein the executable interface code is executable to perform an anonymization of the data value of the first data field.

18. The system of claim 17, wherein the instructions are executable to cause the processor to:

during execution of the executable interface code in the given transaction that uses the first data field, intercept the first data field;

apply the anonymization of the data value of the first data field during the given transaction, the applied anonymization producing an anonymized first data field; and use the anonymized first data field during the given transaction without de-anonymizing the anonymized first data field.

19. The system of claim 17, wherein the indicator in the modified first interface source code file comprises an exit indicator that causes invocation of a callback program, and wherein the executable interface code when executed invokes the callback program to cause the anonymization of the data value of the first data field during the given transaction.

20. The system of claim 19, wherein the callback program comprises an entry point to a policy engine, and the instructions are executable to cause the processor to:

during the given transaction that uses the first data field, intercept the first data field; and apply, by the policy engine responsive to the callback program, the anonymization of the data value of the first data field during the given transaction.

* * * * *